US009791069B2

United States Patent
Tjader

(10) Patent No.: US 9,791,069 B2
(45) Date of Patent: Oct. 17, 2017

(54) FRAME FOR TRENCHLESS PIPE REPLACEMENT SYSTEM AND METHOD

(71) Applicant: TT Technologies, Inc., Aurora, IL (US)

(72) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 639 days.

(21) Appl. No.: 13/722,049

(22) Filed: Dec. 20, 2012

(65) Prior Publication Data

US 2013/0156505 A1  Jun. 20, 2013

Related U.S. Application Data

(60) Provisional application No. 61/578,003, filed on Dec. 20, 2011.

(51) Int. Cl.
*F16L 1/028* (2006.01)
*F16L 55/18* (2006.01)
*B66D 1/00* (2006.01)
*F16L 55/165* (2006.01)

(52) U.S. Cl.
CPC .......... *F16L 1/028* (2013.01); *F16L 55/1658* (2013.01)

(58) Field of Classification Search
CPC ......... F16L 1/028; F16L 1/032; F16L 55/165; F16L 55/1658; F16L 55/18; H02G 1/00; H02G 1/1214; B66D 3/06; B66D 2700/00; B66D 2700/026
USPC ........................ 405/183.5, 184, 184.1, 184.3
See application file for complete search history.

(56) References Cited

U.S. PATENT DOCUMENTS

| | | | | |
|---|---|---|---|---|
| 2,286,781 A | * | 6/1942 | Abramson et al. | .... 254/134.3 R |
| 2,372,162 A | * | 3/1945 | Ryan | ....... B29C 47/92 |
| | | | | 200/61.13 |
| 4,456,225 A | * | 6/1984 | Lucas | ................... 254/134.3 FT |
| 4,538,703 A | * | 9/1985 | Ellis | ......... E06C 7/186 |
| | | | | 182/10 |
| 5,013,188 A | * | 5/1991 | Campbell et al. | ............. 405/184 |
| 5,211,509 A | * | 5/1993 | Roessler | ........................ 405/184 |
| 5,626,442 A | * | 5/1997 | Boyer | ........................... 405/303 |
| 6,045,124 A | * | 4/2000 | Walton | .................. 254/134.3 PA |
| 2008/0138158 A1 | * | 6/2008 | Tjader | ......................... 405/184.3 |
| 2011/0083577 A1 | * | 4/2011 | Tilley | ........................ B61B 7/06 |
| | | | | 104/96 |

FOREIGN PATENT DOCUMENTS

| | | | | | |
|---|---|---|---|---|---|
| FR | WO 2005068893 A1 | * | 7/2005 | .......... | F16L 55/1658 |
| GB | 2351334 B | * | 4/2002 | ............. | B29C 63/34 |
| WO | WO 2009026262 A1 | * | 2/2009 | | |

* cited by examiner

*Primary Examiner* — Frederick L Lagman
*Assistant Examiner* — Stacy Warren
(74) *Attorney, Agent, or Firm* — Schwegman Lundberg & Woessner, P.A.

(57) ABSTRACT

A pipe replacement system and cable guide frame are shown. Configurations are shown that include plurality of guide pulleys attached to the cable guide frame to define a curved path between a pipe to be replaced and a cable pulling system. Configurations are shown where a pipe breaking tool is pulled over the plurality of guide pulleys for ease of removal after a replacement operation. Configurations are also shown that include a stationary splitter adjacent to the cable pulling system to prevent jamming of the cable pulling system.

8 Claims, 5 Drawing Sheets

FRAME FOR TRENCHLESS PIPE REPLACEMENT SYSTEM AND METHOD

PRIORITY

This application is a Non Provisional of and claims the benefit of priority under 35 U.S.C. Section 119(e), to U.S. Provisional Patent Application Ser. No. 61/578,003, filed on Dec. 20, 2011, which is hereby incorporated by reference herein in its entirety.

BACKGROUND

Trenchless pipe replacement is useful for replacement of pipes without the need to excavate the length of the pipe to be replaced. An example of trenchless pipe replacement includes pulling a cutting blade with an expander through the pipe to be replaced, and attaching a new pipe behind the cutting blade. The pipe to be replaced is split, and pushed into the surrounding soil, and the new pipe, of equal or larger diameter, is pulled into the new space within the split pipe. Splitter are commonly used for small diameter pipes, and for pipes of a material that lends itself to splitting. Another example of trenchless pipe replacement includes pipe bursting.

Gas lines are one example of pipes where splitting is useful in pipe replacement. An example includes high density polyethylene (HDPE) gas pipe. Large quantities of 2 inch diameter HDPE gas pipes are currently in need of replacement. 300 miles of gas pipe in a single city in need of replacement is not uncommon. Given the desirability of minimizing trenches, it is also desirable to minimize the size of entry and exit pits for operating trenchless equipment. Cutting pipes in small entry and exit pits can be a challenge due to the small amount of available space to operate cutting tooling.

DETAILED DESCRIPTION

Figure 1:
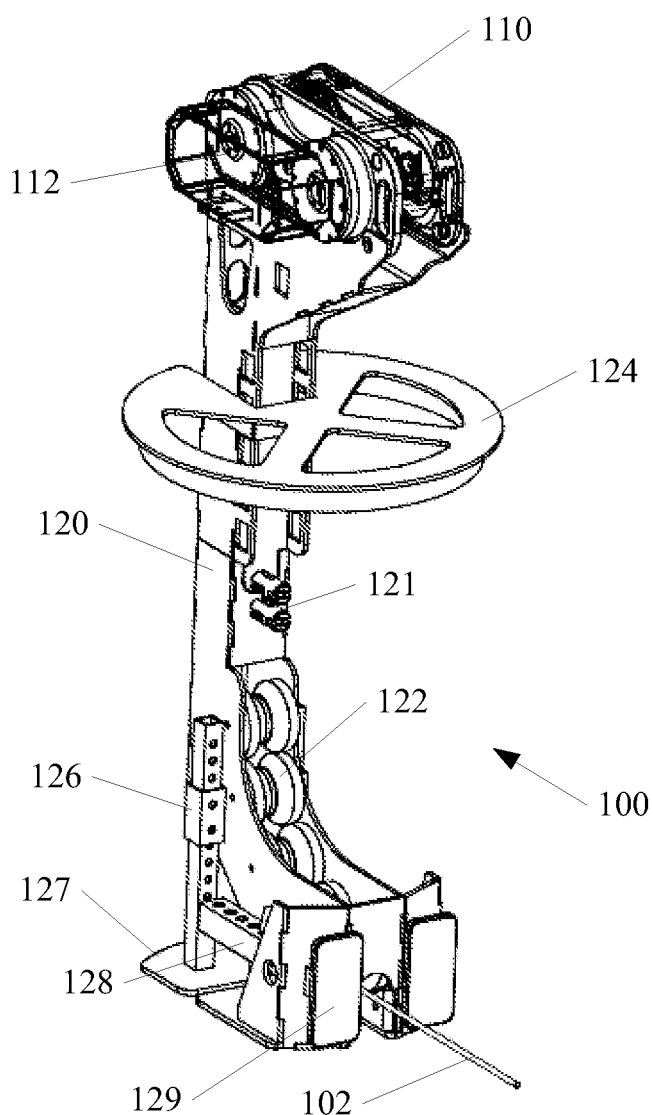
FIG. 1 shows an isometric view of a pipe replacement system according to an embodiment of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and mechanical, structural, or logical changes, etc. may be made without departing from the scope of the present invention. The term "cable" in the following detailed description is used in a broad sense, and is intended to include any number of flexible lines such as wire rope, and other flexible materials that are sufficiently strong for pipe bursting operations.

FIG. 1 shows an example of a pipe replacement system 100. A cable pulling system 110 is shown coupled to a top portion of a cable guide frame 120. A cable 102 is shown in place as in a pipe replacement operation. A continuous tension cable pulling system 110 is shown. In FIG. 1, a winch configuration provides a continuous tension on the cable 102. In other configurations, a cyclic cable pulling system 110 may be used. In the example shown, the cable pulling system 110 includes a winch with dual capstans 112, that is separately removable from the cable guide frame 120, and can be used with different configurations of cable guide frames 120 as shown in examples below.

In selected examples, a manhole adapter 124 is included to locate and support the pipe replacement system 100 adjacent to the pipe to be replaced. Although a manhole adapted configuration of a pipe replacement system 100 is illustrated, the invention is not so limited. Other configurations may be adapted for keyhole pipe replacements, or for open exit pit pipe replacements.

In the example of FIG. 1, the cable guide frame 120 is a boom, that includes an adjustable boom length. A plurality of guide pulleys 122 are shown coupled to the cable guide frame 120. To adjust a length of a boom embodiment, one or more fasteners 121 are shown to selectively engage a first and second portion of the boom embodiment of the cable guide frame 120. Additional adjustments are shown in FIG. 1 to support a distal end of the cable guide frame 120. A vertical adjustor 126 is shown coupled to a base pad 127, and a horizontal adjustor 128 is shown coupled to a lateral pad 129. The vertical adjustor 126 and the horizontal adjustor 128 can be used to align the cable 102 with the point of exit from the ground of a pipe to be replaced (not shown).

Figure 2:
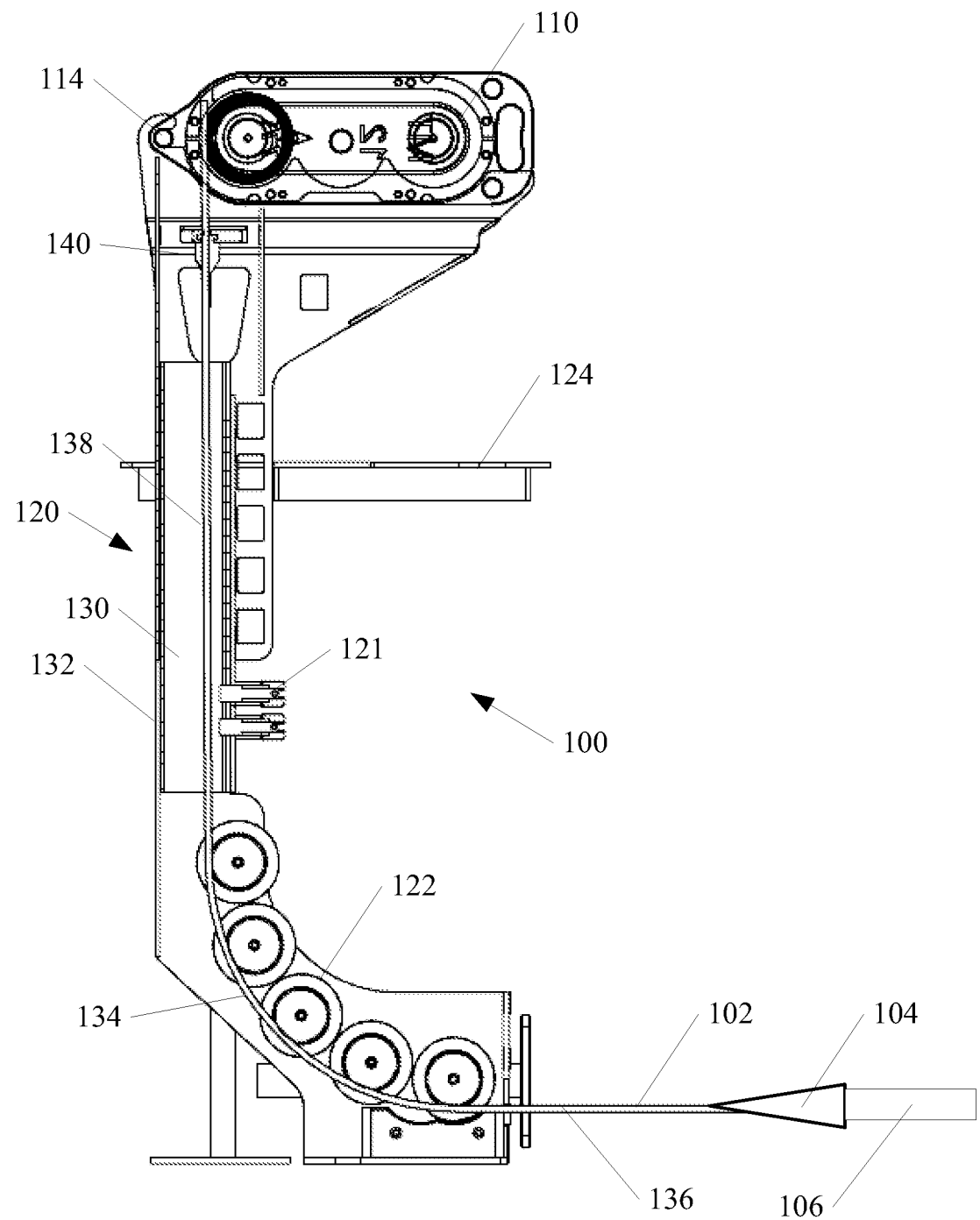
FIG. 2 shows a cutaway side view of the pipe replacement system from FIG. 1, according to an embodiment of the invention.

FIG. 2 shows a cutaway side view of the pipe replacement system 100 from FIG. 1. FIG. 2 shows a cable guide frame 120 with a first boom section 130 that is movable with respect to a second boom section 132. The fasteners 121 are select ably engageable with the first boom section 130 and the second boom section 132 to lock in a selected boom length.

The cable pulling system 110 is shown removably coupled to the cable guide frame 120 using latch 114. Examples with a removable cable pulling system 110 provide flexibility to use a single cable pulling system 110 with different configurations of cable guide frames 120. Selected examples of two different cable guide frames are shown in Figures discussed below. In one example the cable pulling system 110 can also be disengaged from the cable guide frame 120 and flipped over to pull a cable 102 in a reverse direction. This configuration saves time by not requiring a cable to be reversed out of the cable pulling system 110 in preparation for each successive pulling operation.

The cable 102 is shown guided along a curved path 134 that is defined by the plurality of guide pulleys 122. The curved path 134 transitions the cable from a substantially horizontal point of exit 136 to a substantially vertical point 138 within the cable guide frame 120. The curved path 134 defines a relatively large radius compared to a single pulley. The large radius curved path defines a smooth transition between the point of exit from the ground and the cable pulling system 110.

In operation, a pipe breaking tool 104, such as a ductile splitter including a blade; a ductile splitter including a cutting wheel, an expander, etc. exits the ground at the end of a replacement run. Due to tight spaces in small exit pits, it can be difficult to remove the pipe breaking tool 104 from the end of the cable 102 in order to gain access to the new pipe 106 being pulled in behind the pipe breaking tool 104.

Using configurations as described in the present disclosure, the cable 102, and the pipe breaking tool 104, and a portion of the new pipe 106 may be pulled along the plurality of guide pulleys 122 after exiting the ground. The large radius curved path 134 allows the rigid pipe breaking tool 104 to easily transition from the ground and follow along the curved path 134 without kinking the cable 102 or causing damage to the rigid pipe breaking tool 104. Once the pipe breaking tool 104 is pulled into the substantially vertical point 138 within the cable guide frame 120, the pipe replacement system 100 can be removed from the exit pit, and the pipe breaking tool 104 is easily accessible, having been pulled a larger distance from the point of exit 136.

In one example one or more of the plurality of guide pulleys 122 include a surface material that is less damaging than metal guide pulleys. For example the pipe breaking tool 104 may include sharp pipe cutting blades that may be damaged by travelling along the curved path 134 against the plurality of guide pulleys 122. In one example one or more of the plurality of guide pulleys 122 includes a polymer coating. In one example one or more of the plurality of guide pulleys 122 is formed from a polymeric material. Examples of polymeric materials may include polyurethane or high density polyethylene, or any other suitably durable polymeric material that reduces damage to the pipe breaking tool 104.

A stationary splitter 140 is also shown in FIG. 2. In the example shown in FIG. 2, the stationary splitter 140 is located above ground level, adjacent to the substantially vertical point 138. Frequently, in operation, a portion of a pipe being replaced will pull out of the ground in front of the pipe breaking tool 104, instead of being split by the pipe breaking tool 104. In this situation, the portion of a pipe being replaced will remain on the cable 102, and jam against the cable pulling system 110.

Embodiments including the stationary splitter 140 remove this problem. The portion of the pipe being replaced will pull along the curved path 134, and into the stationary splitter 140. The stationary splitter 140 then splits the errant portion of the pipe being replaced before it can jam against the cable pulling system 110.

Figure 3:
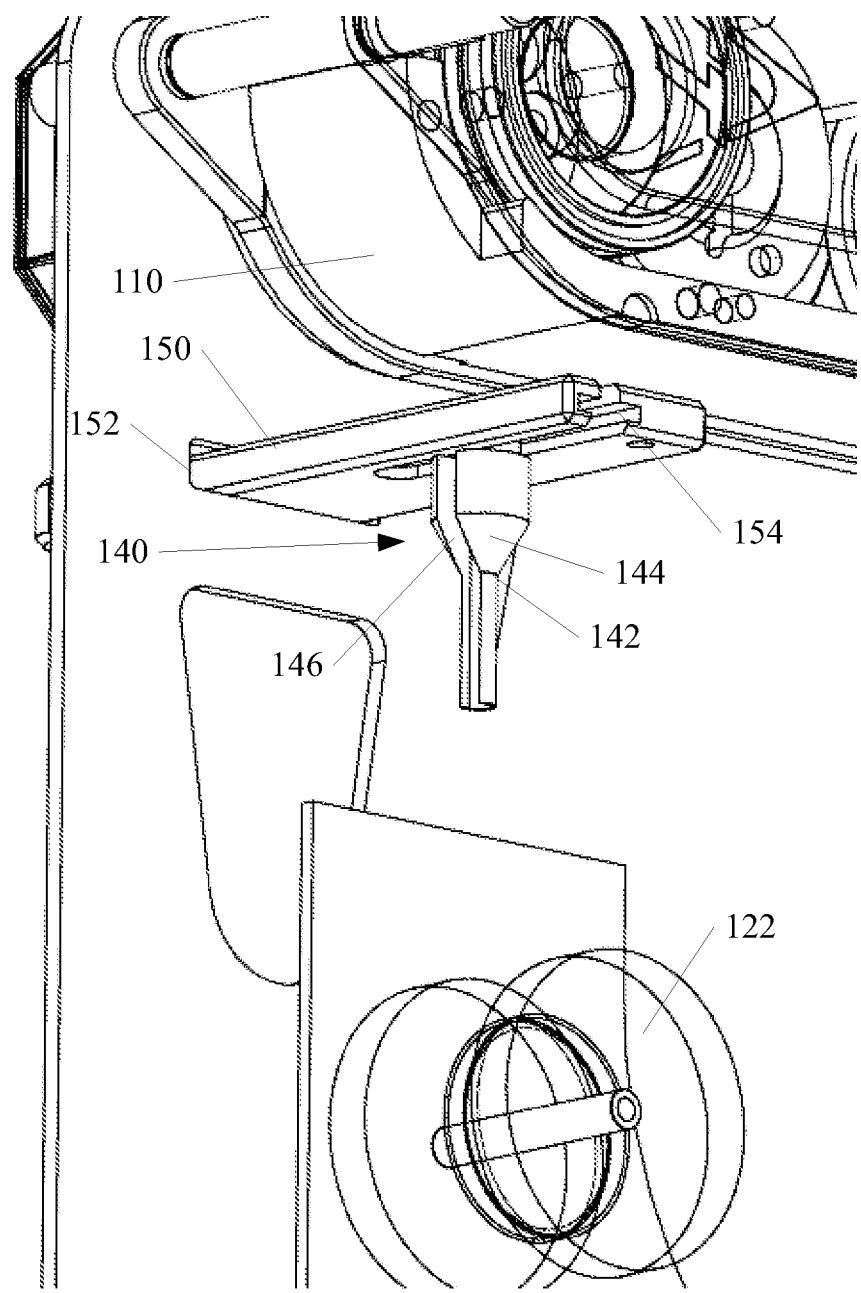
FIG. 3 shows a close up view of a portion of a pipe replacement system according to an embodiment of the invention.

FIG. 3 shows a close up view of the stationary splitter 140 according to a selected example configuration. FIG. 3 shows a blade 142 and an expander 144 as part of the stationary splitter 140. Although both a blade 142 and an expander 144 are shown as an example, other embodiments may only include a blade 142, or only include an expander 144.

A slot 146 is shown in the stationary splitter 140. Configurations that include a slot 146 are easy to install onto a cable 102 that is already set up for a pipe replacement run. The slot 146 can be located around the cable 102 while in place, to position the stationary splitter 140.

Figure 4:
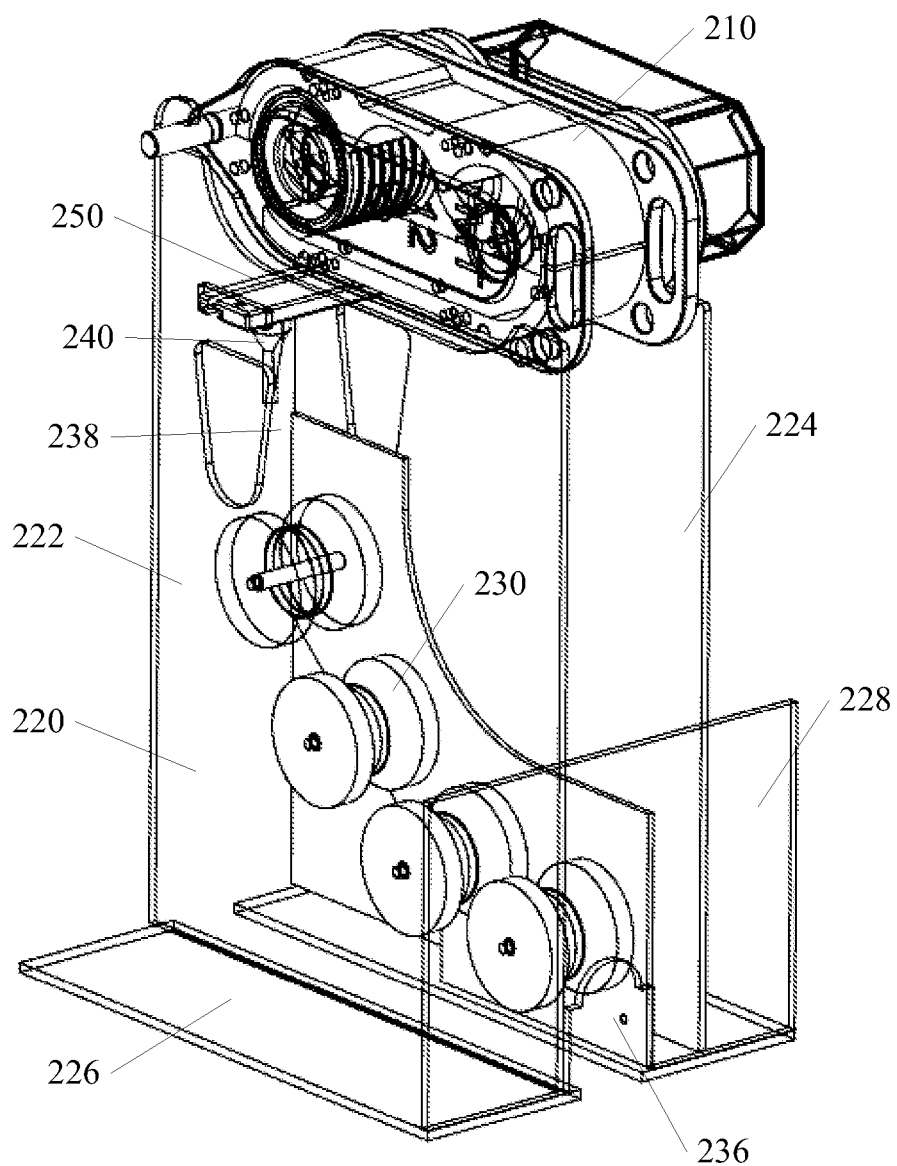
FIG. 4 shows an isometric view of another pipe replacement system according to an embodiment of the invention.

FIG. 3 further shows a holder 150 with a laterally adjustable slot 154 that mates with an end of the stationary splitter 140. In the example shown, the holder 150 is adjustable within an opening 152 in the cable guide frame 120. Although only one opening 152 is shown in a single side of the cable guide frame 120, in selected examples, such as shown in FIG. 4, a second opening in an opposite side of the cable guide frame 120 also engages the holder 150 to more firmly hold the stationary splitter 140 in place In an installation operation of the stationary splitter 140, the holder 150 can be moved within the opening 152, and the stationary splitter 140 can be moved within the laterally adjustable slot 154. In this way, the slot 146 of the stationary splitter 140 can be positioned over the cable, with the stationary splitter 140 being held firmly in place to split any errant portions of the pipe being replaced before they can jam against the cable pulling system 110.

FIG. 4 illustrates another example of a pipe replacement system 200. A cable pulling system 210 is shown coupled to a top portion of a cable guide frame 220. In FIG. 4, a dual capstan winch system 210, similar to examples shown above, is used. In the system 200 of FIG. 4, the cable guide frame 220 is not a boom configuration, but is instead configured for use in an exit pit or exit location where components of the operation are more accessible. The cable guide frame 220 includes a lateral reaction plate 228 and a vertical reaction plate 226. In selected examples, the pair of reaction plates 228, 226 provide resistance to downward twisting of the pipe replacement system 200 during an operation.

The cable guide frame 220 includes a first plate 222 and a second plate 224. A plurality of guide pulleys 230 are shown located between the first plate 222 and the second plate 224. Similar to the pipe replacement system 100, the plurality of guide pulleys 230 define a curved path. The curved path transitions a cable from a substantially horizontal point of exit 236 to a substantially vertical point 238 within the cable guide frame 220. The curved path defines a relatively large radius compared to a single pulley.

As with embodiments described above, in operation, a pipe breaking tool may be pulled along the plurality of guide pulleys 230 after exiting the ground. The large radius curved path allows a rigid pipe breaking tool to easily transition from the ground and follow along the curved path without kinking the cable or causing damage to the pipe breaking tool.

Similar to examples described above, in one example one or more of the plurality of guide pulleys 230 include a surface material that is less damaging than metal guide pulleys. In one example one or more of the plurality of guide pulleys 230 includes a polymer coating. In one example one or more of the plurality of guide pulleys 230 is formed from a polymeric material. Examples of polymeric materials may include polyurethane or high density polyethylene, or any other suitably durable polymeric material that reduces damage to a pipe breaking tool.

A stationary splitter 240 is also shown in FIG. 4, coupled to a holder 250. In the example shown, the holder 250 is engaged within openings in both the first plate 222 and the second plate 224 of the cable guide frame 220.

Figure 5:
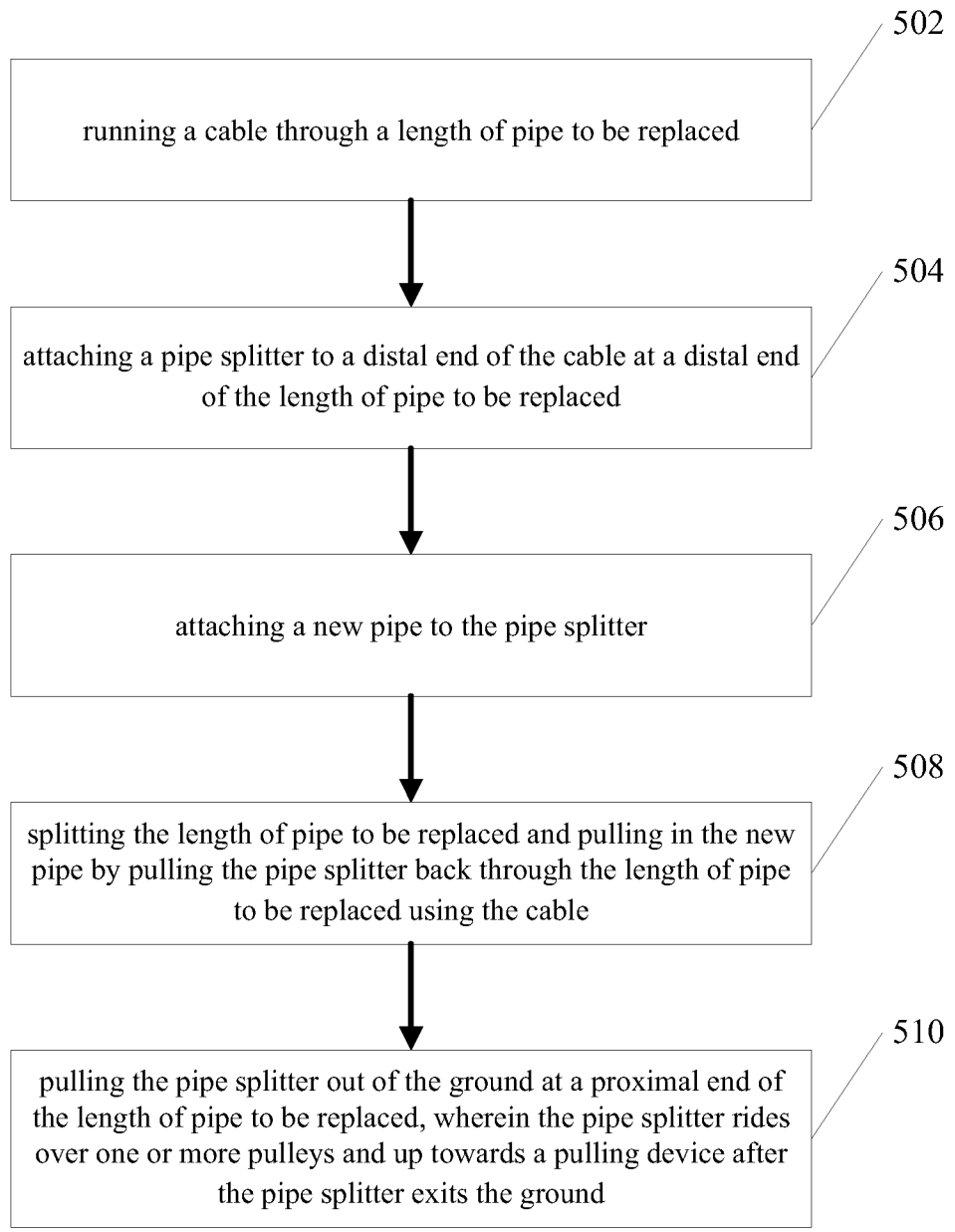
FIG. 5 shows a flow diagram of a method of pipe replacement according to an embodiment of the invention.

FIG. 5 shows an example method of pipe replacement according to an embodiment of the invention. In operation 502, the method recites running a cable through a length of pipe to be replaced. In operation 504, a pipe splitter is attached to a distal end of the cable at a distal end of the length of pipe to be replaced, and in operation 506, a new pipe is attached to the pipe splitter. Operation 508 recites splitting the length of pipe to be replaced and pulling in the new pipe by pulling the pipe splitter back through the length of pipe to be replaced using the cable. In operation 510, the pipe splitter is pulled out of the ground at a proximal end of the length of pipe to be replaced, wherein the pipe splitter rides over one or more pulleys and up towards a pulling device after the pipe splitter exits the ground. Examples of pulley configurations used in operation 510 include pulleys 122 and pulleys 230 from Figures discussed above. In other methods of operation, a portion of the length of pipe to be replaced is further split using a stationary splitter at the proximal end of the pipe to be replaced if a portion of the pipe to be replaced pulls out of the ground.

While a number of advantages of embodiments of the invention are described, any lists of above mentioned advantages are not intended to be exhaustive. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and methods are used. The scope of the invention should be determined with reference to the appended claims, along with the full scope of equivalents to which such claims are entitled.

I claim:

1. A pipe replacement system, comprising:
    a cable pulling system including a cable adapted to pull a pipe breaking tool;
    a pipe breaking tool coupled to a leading end of the cable, the pipe breaking tool having a diameter larger than the cable;
    a cable guide frame coupled to the cable pulling system;
    a plurality of guide pulleys attached to the cable guide frame, wherein the plurality of guide pulleys are positioned to define a curved path between a pipe to be replaced and the cable pulling system, the plurality of guide pulleys including a width to accept the diameter of the pipe breaking tool;
    a reaction plate coupled to the cable guide frame, the reaction plate having an opening larger than the diameter of the pipe breaking tool; and
    a stationary splitter located on the cable guide frame, the stationary splitter including a lateral slot to accept sideways insertion of the cable.

2. The pipe replacement system of claim 1, wherein the guide pulleys include a polymeric contact surface.

3. The pipe replacement system of claim 1, herein the guide pulleys are substantially all polymeric material.

4. The pipe replacement system of claim 1, wherein the cable guide frame is a boom adapted to operate with the cable pulling system above ground, and the boom within an exit pit.

5. The pipe replacement system of claim 1, wherein the cable guide frame is adapted to operate with the cable pulling system and the cable guide frame substantially within an exit pit.

6. The pipe replacement system of claim 1, wherein the stationary splitter further includes an expander.

7. The pipe replacement system of claim 6, wherein the stationary splitter is located above ground level.

8. The pipe replacement system of claim 1, wherein the pipe replacement system is adapted for a keyhole operation.

* * * * *